US008296127B2

(12) United States Patent
Marcu et al.

(10) Patent No.: US 8,296,127 B2
(45) Date of Patent: Oct. 23, 2012

(54) DISCOVERY OF PARALLEL TEXT PORTIONS IN COMPARABLE COLLECTIONS OF CORPORA AND TRAINING USING COMPARABLE TEXTS

(75) Inventors: Daniel Marcu, Hermosa Beach, CA (US); Dragos Stefan Munteanu, Culver City, CA (US)

(73) Assignee: University of Southern California, Los Angeles, CA (US)

( * ) Notice: Subject to any disclaimer, the term of this patent is extended or adjusted under 35 U.S.C. 154(b) by 1730 days.

(21) Appl. No.: 11/087,376

(22) Filed: Mar. 22, 2005

(65) Prior Publication Data

US 2005/0228643 A1 Oct. 13, 2005

Related U.S. Application Data (60) Provisional application No. 60/555,807, filed on Mar. 23, 2004.

(51) Int. Cl.
G06F 17/28 (2006.01)

(52) U.S. Cl. ..................................... 704/5; 704/2; 704/4

(58) Field of Classification Search .................. None
See application file for complete search history.

(56) References Cited

U.S. PATENT DOCUMENTS

| 4,502,128 A | 2/1985 | Okajima et al. |
| 4,599,691 A | 7/1986 | Sakaki et al. |
| 4,615,002 A | 9/1986 | Innes |
| 4,661,924 A | 4/1987 | Okamoto et al. |
| 4,787,038 A | 11/1988 | Doi et al. |
| 4,791,587 A | 12/1988 | Doi |
| 4,800,522 A * | 1/1989 | Miyao et al. ................. 704/2 |
| 4,814,987 A | 3/1989 | Miyao et al. |
| 4,942,526 A | 7/1990 | Okajima et al. |
| 4,980,829 A | 12/1990 | Okajima et al. |
| 5,020,112 A | 5/1991 | Chou |
| 5,088,038 A | 2/1992 | Tanaka et al. |
| 5,091,876 A | 2/1992 | Kumano et al. |
| 5,146,405 A | 9/1992 | Church |
| 5,167,504 A | 12/1992 | Mann |
| 5,181,163 A | 1/1993 | Nakajima et al. |
| 5,212,730 A | 5/1993 | Wheatley et al. |
| 5,218,537 A | 6/1993 | Hemphill et al. |
| 5,220,503 A | 6/1993 | Suzuki et al. |
| 5,267,156 A | 11/1993 | Nomiyama |
| 5,268,839 A | 12/1993 | Kaji |
| 5,295,068 A | 3/1994 | Nishino et al. |

(Continued)

FOREIGN PATENT DOCUMENTS

EP 0469884 A2 2/1992

(Continued)

OTHER PUBLICATIONS

Tanaka, K. and Iwasaki, H. "Extraction of Lexical Translations from Non-Aligned Corpora," Proceedings of COLING 1996.*

(Continued)

Primary Examiner — Talivaldis Ivars Smits
(74) Attorney, Agent, or Firm — Carr & Ferrell LLP (57) ABSTRACT

A translation training device which extracts from two non-parallel Corpora a set of parallel sentences. The system finds parameters between different sentences or phrases, in order to find parallel sentences. The parallel sentences are then used for training a data-driven machine translation system. The process can be applied repetitively until sufficient data is collected or until the performance of the translation system stops improving.

29 Claims, 4 Drawing Sheets

U.S. PATENT DOCUMENTS

| | | |
|---|---|---|
| 5,311,429 A | 5/1994 | Tominaga |
| 5,387,104 A | 2/1995 | Corder |
| 5,432,948 A | 7/1995 | Davis et al. |
| 5,442,546 A | 8/1995 | Kaji et al. |
| 5,477,450 A | 12/1995 | Takeda et al. |
| 5,477,451 A | 12/1995 | Brown et al. |
| 5,495,413 A | 2/1996 | Kutsumi et al. |
| 5,497,319 A | 3/1996 | Chong et al. |
| 5,510,981 A | 4/1996 | Berger et al. |
| 5,528,491 A | 6/1996 | Kuno et al. |
| 5,535,120 A | 7/1996 | Chong et al. |
| 5,541,836 A | 7/1996 | Church et al. |
| 5,541,837 A | 7/1996 | Fushimoto |
| 5,548,508 A | 8/1996 | Nagami |
| 5,644,774 A | 7/1997 | Fukumochi et al. |
| 5,675,815 A | 10/1997 | Yamauchi et al. |
| 5,687,383 A | 11/1997 | Nakayama et al. |
| 5,696,980 A | 12/1997 | Brew |
| 5,724,593 A | 3/1998 | Hargrave, III et al. |
| 5,752,052 A | 5/1998 | Richardson et al. |
| 5,754,972 A | 5/1998 | Baker et al. |
| 5,761,631 A | 6/1998 | Nasukawa |
| 5,761,689 A | 6/1998 | Rayson et al. |
| 5,768,603 A | 6/1998 | Brown et al. |
| 5,779,486 A | 7/1998 | Ho et al. |
| 5,781,884 A | 7/1998 | Pereira et al. |
| 5,794,178 A | 8/1998 | Caid et al. |
| 5,805,832 A | 9/1998 | Brown et al. |
| 5,806,032 A | 9/1998 | Sproat |
| 5,819,265 A | 10/1998 | Ravin et al. |
| 5,826,219 A | 10/1998 | Kutsumi |
| 5,826,220 A | 10/1998 | Takeda et al. |
| 5,845,143 A | 12/1998 | Yamauchi et al. |
| 5,848,385 A | 12/1998 | Poznanski et al. |
| 5,848,386 A | 12/1998 | Motoyama |
| 5,855,015 A | 12/1998 | Shoham |
| 5,864,788 A | 1/1999 | Kutsumi |
| 5,867,811 A | 2/1999 | O'Donoghue |
| 5,870,706 A | 2/1999 | Alshawi |
| 5,893,134 A | 4/1999 | O'Donoghue et al. |
| 5,903,858 A | 5/1999 | Saraki |
| 5,907,821 A * | 5/1999 | Kaji et al. ................ 704/4 |
| 5,909,681 A | 6/1999 | Passera et al. |
| 5,966,685 A | 10/1999 | Flanagan et al. |
| 5,983,169 A | 11/1999 | Kozma |
| 5,987,402 A | 11/1999 | Murata et al. |
| 5,987,404 A | 11/1999 | Della Pietra et al. |
| 5,991,710 A | 11/1999 | Papineni et al. |
| 5,995,922 A | 11/1999 | Penteroudakis et al. |
| 6,018,617 A | 1/2000 | Sweitzer et al. |
| 6,031,984 A | 2/2000 | Walser |
| 6,032,111 A | 2/2000 | Mohri |
| 6,064,819 A | 5/2000 | Franssen et al. |
| 6,064,951 A | 5/2000 | Park et al. |
| 6,073,143 A | 6/2000 | Nishikawa et al. |
| 6,077,085 A | 6/2000 | Parry et al. |
| 6,092,034 A | 7/2000 | McCarley et al. |
| 6,119,077 A | 9/2000 | Shinozaki |
| 6,131,082 A | 10/2000 | Hargrave, III et al. |
| 6,161,082 A | 12/2000 | Goldberg et al. |
| 6,182,014 B1 | 1/2001 | Kenyon et al. |
| 6,182,027 B1 | 1/2001 | Nasukawa et al. |
| 6,205,456 B1 | 3/2001 | Nakao |
| 6,223,150 B1 | 4/2001 | Duan et al. |
| 6,233,544 B1 | 5/2001 | Alshawi |
| 6,233,545 B1 | 5/2001 | Datig |
| 6,233,546 B1 | 5/2001 | Datig |
| 6,236,958 B1 | 5/2001 | Lange et al. |
| 6,269,351 B1 | 7/2001 | Black |
| 6,275,789 B1 | 8/2001 | Moser et al. |
| 6,278,967 B1 | 8/2001 | Akers et al. |
| 6,278,969 B1 | 8/2001 | King et al. |
| 6,285,978 B1 | 9/2001 | Bernth et al. |
| 6,289,302 B1 | 9/2001 | Kuo |
| 6,304,841 B1 | 10/2001 | Berger et al. |
| 6,311,152 B1 | 10/2001 | Bai et al. |
| 6,317,708 B1 | 11/2001 | Witbrock et al. |
| 6,327,568 B1 | 12/2001 | Joost |
| 6,330,529 B1 | 12/2001 | Ito |
| 6,330,530 B1 | 12/2001 | Horiguchi et al. |
| 6,356,864 B1 | 3/2002 | Foltz et al. |
| 6,360,196 B1 | 3/2002 | Poznanski et al. |
| 6,389,387 B1 | 5/2002 | Poznanski et al. |
| 6,393,388 B1 | 5/2002 | Franz et al. |
| 6,393,389 B1 | 5/2002 | Chanod et al. |
| 6,415,250 B1 | 7/2002 | van den Akker |
| 6,460,015 B1 | 10/2002 | Hetherington et al. |
| 6,470,306 B1 | 10/2002 | Pringle et al. |
| 6,473,729 B1 | 10/2002 | Gastaldo et al. |
| 6,480,698 B2 | 11/2002 | Ho et al. |
| 6,490,549 B1 | 12/2002 | Ulicny et al. |
| 6,498,921 B1 | 12/2002 | Ho et al. |
| 6,502,064 B1 | 12/2002 | Miyahira et al. |
| 6,529,865 B1 | 3/2003 | Duan et al. |
| 6,535,842 B1 | 3/2003 | Roche et al. |
| 6,587,844 B1 | 7/2003 | Mohri |
| 6,647,364 B1 | 11/2003 | Yumura et al. |
| 6,691,279 B2 | 2/2004 | Yoden et al. |
| 6,745,161 B1 | 6/2004 | Arnold et al. |
| 6,757,646 B2 | 6/2004 | Marchisio |
| 6,778,949 B2 | 8/2004 | Duan et al. |
| 6,782,356 B1 | 8/2004 | Lopke |
| 6,810,374 B2 | 10/2004 | Kang |
| 6,848,080 B1 | 1/2005 | Lee et al. |
| 6,857,022 B1 | 2/2005 | Scanlan |
| 6,885,985 B2 * | 4/2005 | Hull ................................ 704/2 |
| 6,901,361 B1 | 5/2005 | Portilla |
| 6,904,402 B1 | 6/2005 | Wang et al. |
| 6,952,665 B1 | 10/2005 | Shimomura et al. |
| 6,983,239 B1 | 1/2006 | Epstein |
| 6,996,520 B2 | 2/2006 | Levin |
| 6,999,925 B2 | 2/2006 | Fischer et al. |
| 7,013,262 B2 | 3/2006 | Tokuda et al. |
| 7,016,827 B1 | 3/2006 | Ramaswamy et al. |
| 7,016,977 B1 | 3/2006 | Dunsmoir et al. |
| 7,024,351 B2 | 4/2006 | Wang |
| 7,031,911 B2 | 4/2006 | Zhou et al. |
| 7,085,708 B2 | 8/2006 | Manson |
| 7,103,531 B2 | 9/2006 | Moore |
| 7,107,204 B1 | 9/2006 | Liu et al. |
| 7,107,215 B2 | 9/2006 | Ghali |
| 7,113,903 B1 | 9/2006 | Riccardi et al. |
| 7,143,036 B2 | 11/2006 | Weise |
| 7,146,358 B1 | 12/2006 | Gravano et al. |
| 7,149,688 B2 | 12/2006 | Schalkwyk |
| 7,174,289 B2 | 2/2007 | Sukehiro |
| 7,177,792 B2 | 2/2007 | Knight et al. |
| 7,191,115 B2 | 3/2007 | Moore |
| 7,197,451 B1 | 3/2007 | Carter et al. |
| 7,206,736 B2 | 4/2007 | Moore |
| 7,209,875 B2 | 4/2007 | Quirk et al. |
| 7,219,051 B2 | 5/2007 | Moore |
| 7,239,998 B2 | 7/2007 | Xun |
| 7,249,012 B2 | 7/2007 | Moore |
| 7,249,013 B2 | 7/2007 | Al-Onaizan et al. |
| 7,283,950 B2 | 10/2007 | Pournasseh et al. |
| 7,295,962 B2 | 11/2007 | Marcu |
| 7,302,392 B1 | 11/2007 | Thenthiruperai et al. |
| 7,340,388 B2 | 3/2008 | Soricut et al. |
| 7,346,487 B2 | 3/2008 | Li |
| 7,346,493 B2 | 3/2008 | Ringger et al. |
| 7,349,839 B2 | 3/2008 | Moore |
| 7,356,457 B2 | 4/2008 | Pinkham et al. |
| 7,373,291 B2 | 5/2008 | Garst |
| 7,383,542 B2 | 6/2008 | Richardson et al. |
| 7,389,222 B1 | 6/2008 | Langmead et al. |
| 7,389,234 B2 | 6/2008 | Schmid et al. |
| 7,409,332 B2 | 8/2008 | Moore |
| 7,447,623 B2 | 11/2008 | Appleby |
| 7,454,326 B2 | 11/2008 | Marcu et al. |
| 7,496,497 B2 | 2/2009 | Liu |
| 7,533,013 B2 | 5/2009 | Marcu |
| 7,536,295 B2 | 5/2009 | Cancedda et al. |
| 7,546,235 B2 | 6/2009 | Brockett et al. |
| 7,565,281 B2 | 7/2009 | Appleby |
| 7,574,347 B2 | 8/2009 | Wang |
| 7,580,830 B2 | 8/2009 | Al-Onaizan et al. |

| | | |
|---|---|---|
| 7,620,538 B2 | 11/2009 | Marcu et al. |
| 7,624,005 B2 | 11/2009 | Koehn et al. |
| 7,624,020 B2 | 11/2009 | Yamada et al. |
| 7,680,646 B2 | 3/2010 | Lux-Pogodalla et al. |
| 7,689,405 B2 | 3/2010 | Marcu |
| 7,698,125 B2 | 4/2010 | Graehl et al. |
| 7,707,025 B2 | 4/2010 | Whitelock |
| 7,711,545 B2 | 5/2010 | Koehn |
| 7,716,037 B2 | 5/2010 | Precoda et al. |
| 7,813,918 B2 | 10/2010 | Muslea et al. |
| 7,974,833 B2 | 7/2011 | Soricut et al. |
| 2001/0009009 A1 | 7/2001 | Iizuka |
| 2001/0029455 A1 | 10/2001 | Chin et al. |
| 2002/0002451 A1 | 1/2002 | Sukehiro |
| 2002/0013693 A1 | 1/2002 | Fuji |
| 2002/0040292 A1 | 4/2002 | Marcu |
| 2002/0046018 A1 | 4/2002 | Marcu et al. |
| 2002/0046262 A1 | 4/2002 | Heilig et al. |
| 2002/0078091 A1 | 6/2002 | Vu et al. |
| 2002/0099744 A1 | 7/2002 | Coden et al. |
| 2002/0111788 A1 | 8/2002 | Kimpara |
| 2002/0152063 A1 | 10/2002 | Tokieda et al. |
| 2002/0169592 A1 | 11/2002 | Aityan |
| 2002/0188438 A1 | 12/2002 | Knight et al. |
| 2002/0198699 A1 | 12/2002 | Greene et al. |
| 2002/0198701 A1 | 12/2002 | Moore |
| 2003/0009322 A1 | 1/2003 | Marcu |
| 2003/0023423 A1 | 1/2003 | Yamada et al. |
| 2003/0144832 A1 | 7/2003 | Harris |
| 2003/0158723 A1 | 8/2003 | Masuichi et al. |
| 2003/0176995 A1 | 9/2003 | Sukehiro |
| 2003/0182102 A1 | 9/2003 | Corston-Oliver et al. |
| 2003/0191626 A1 | 10/2003 | Al-Onaizan et al. |
| 2003/0204400 A1* | 10/2003 | Marcu et al. ............... 704/251 |
| 2003/0217052 A1 | 11/2003 | Rubenczyk et al. |
| 2003/0233222 A1 | 12/2003 | Soricut et al. |
| 2004/0015342 A1 | 1/2004 | Garst |
| 2004/0024581 A1 | 2/2004 | Koehn et al. |
| 2004/0030551 A1 | 2/2004 | Marcu et al. |
| 2004/0059708 A1 | 3/2004 | Dean et al. |
| 2004/0068411 A1 | 4/2004 | Scanlan |
| 2004/0098247 A1* | 5/2004 | Moore ............................. 704/4 |
| 2004/0111253 A1 | 6/2004 | Luo et al. |
| 2004/0167768 A1 | 8/2004 | Travieso et al. |
| 2004/0167784 A1 | 8/2004 | Travieso et al. |
| 2004/0193401 A1 | 9/2004 | Ringger et al. |
| 2004/0230418 A1 | 11/2004 | Kitamura |
| 2004/0237044 A1 | 11/2004 | Travieso et al. |
| 2004/0260532 A1 | 12/2004 | Richardson et al. |
| 2005/0021322 A1 | 1/2005 | Richardson et al. |
| 2005/0021517 A1 | 1/2005 | Marchisio |
| 2005/0026131 A1 | 2/2005 | Elzinga et al. |
| 2005/0033565 A1 | 2/2005 | Koehn |
| 2005/0038643 A1 | 2/2005 | Koehn |
| 2005/0060160 A1 | 3/2005 | Roh et al. |
| 2005/0075858 A1 | 4/2005 | Pournasseh et al. |
| 2005/0102130 A1 | 5/2005 | Quirk et al. |
| 2005/0125218 A1 | 6/2005 | Rajput et al. |
| 2005/0149315 A1 | 7/2005 | Flanagan et al. |
| 2005/0171757 A1 | 8/2005 | Appleby |
| 2005/0204002 A1 | 9/2005 | Friend |
| 2005/0228640 A1 | 10/2005 | Aue et al. |
| 2005/0228642 A1 | 10/2005 | Mau et al. |
| 2005/0234701 A1 | 10/2005 | Graehl et al. |
| 2006/0015320 A1 | 1/2006 | Och |
| 2006/0015323 A1 | 1/2006 | Udupa et al. |
| 2006/0018541 A1 | 1/2006 | Chelba et al. |
| 2006/0020448 A1 | 1/2006 | Chelba et al. |
| 2006/0095248 A1 | 5/2006 | Menezes et al. |
| 2006/0111891 A1 | 5/2006 | Menezes et al. |
| 2006/0111892 A1 | 5/2006 | Menezes et al. |
| 2006/0111896 A1 | 5/2006 | Menezes et al. |
| 2006/0129424 A1 | 6/2006 | Chan |
| 2006/0142995 A1 | 6/2006 | Knight et al. |
| 2006/0150069 A1 | 7/2006 | Chang |
| 2006/0190241 A1 | 8/2006 | Goutte et al. |
| 2007/0016400 A1 | 1/2007 | Soricut et al. |
| 2007/0016401 A1 | 1/2007 | Ehsani et al. |
| 2007/0033001 A1 | 2/2007 | Muslea et al. |
| 2007/0094169 A1 | 4/2007 | Yamada et al. |
| 2007/0112553 A1 | 5/2007 | Jacobson |
| 2007/0112555 A1 | 5/2007 | Lavi et al. |
| 2007/0112556 A1 | 5/2007 | Lavi et al. |
| 2007/0122792 A1 | 5/2007 | Galley et al. |
| 2007/0168450 A1 | 7/2007 | Prajapat et al. |
| 2007/0180373 A1 | 8/2007 | Bauman et al. |
| 2007/0219774 A1 | 9/2007 | Quirk et al. |
| 2007/0250306 A1 | 10/2007 | Marcu et al. |
| 2007/0269775 A1 | 11/2007 | Andreev et al. |
| 2007/0294076 A1 | 12/2007 | Shore et al. |
| 2008/0114583 A1 | 5/2008 | Al-Onaizan et al. |
| 2008/0154581 A1 | 6/2008 | Lavi et al. |
| 2008/0183555 A1 | 7/2008 | Walk |
| 2008/0215418 A1 | 9/2008 | Kolve et al. |
| 2008/0249760 A1 | 10/2008 | Marcu et al. |
| 2008/0270109 A1 | 10/2008 | Och |
| 2008/0270112 A1 | 10/2008 | Shimohata |
| 2008/0281578 A1 | 11/2008 | Kumaran et al. |
| 2008/0307481 A1 | 12/2008 | Panje |
| 2009/0076792 A1 | 3/2009 | Lawson-Tancred |
| 2009/0083023 A1 | 3/2009 | Foster et al. |
| 2009/0119091 A1 | 5/2009 | Sarig |
| 2009/0326912 A1 | 12/2009 | Ueffing |
| 2010/0017293 A1 | 1/2010 | Lung et al. |
| 2010/0042398 A1 | 2/2010 | Marcu et al. |
| 2010/0174524 A1 | 7/2010 | Koehn |
| 2011/0029300 A1 | 2/2011 | Marcu et al. |
| 2011/0082684 A1 | 4/2011 | Soricut et al. |

FOREIGN PATENT DOCUMENTS

| | | |
|---|---|---|
| EP | 0715265 A2 | 6/1996 |
| EP | 0933712 A2 | 8/1999 |
| EP | 0933712 | 1/2001 |
| JP | 07244666 | 1/1995 |
| JP | 10011447 | 1/1998 |
| JP | 11272672 | 10/1999 |

OTHER PUBLICATIONS

Abney, Stephen, "Parsing by Chunks," 1991, Principle-Based Parsing: Computation and Psycholinguistics, vol. 44, pp. 257-279.

Al-Onaizan et al., "Statistical Machine Translation," 1999, JHU Summer Tech Workshop, Final Report, pp. 1-42.

Al-Onaizan, Y. and Knight, K., "Named Entity Translation: Extended Abstract" 2002, Proceedings of HLT-02, San Diego, CA.

Al-Onaizan, Y. and Knight, K., "Translating Named Entities Using Monolingual and Bilingual Resources," 2002, Proc. of the 40th Annual Meeting of the ACL,pp. 400-408.

Al-Onaizan et al., "Translating with Scarce Resources," 2000, 17th National Conference of the American Association for Artificial Intelligence, Austin, TX, pp. 672-678.

Alshawi et al., "Learning Dependency Translation Models as Collections of Finite-State Head Transducers," 2000, Computational Linguistics, vol. 26, pp. 45-60.

Arbabi et al., "Algorithms for Arabic name transliteration," Mar. 1994, IBM Journal of Research and Development, vol. 38, Issue 2, pp. 183-194.

Barnett et al., "Knowledge and Natural Language Processing," Aug. 1990, Communications of the ACM, vol. 33, Issue 8, pp. 50-71.

Bangalore, S. and Rambow, O., "Corpus-Based Lexical Choice in Natural Generation," 2000, Proc. of the 38th Annual ACL, Hong Kong, pp. 464-471.

Bangalore, S. and Rambow, O., "Exploiting a Probabilistic Hierarchical Model for Generation," 2000, Proc. of 18th conf. on Computational Linguistics, vol. 1, pp. 42-48.

Bangalore, S. and Rambow, O., "Evaluation Metrics for Generation," 2000, Proc. of the 1st International Natural Language Generation Conf., vol. 14, p. 1-8.

Bangalore, S. and Rambow, O., "Using TAGs, a Tree Model, and a Language Model for Generation," May 2000, Workshop TAG+45, Paris.

Baum, Leonard, "An Inequality and Associated Maximization Technique in Statistical Estimation for Probabilistic Functions of Markov Processes", 1972, Inequalities 3:1-8.

Bikel et al., "An Algorithm that Learns What's in a Name," 1999, Machine Learning Journal Special Issue on Natural Language Learning, vol. 34, pp. 211-232.

Brants, Thorsten, "TnT—A Statistical Part-of-Speech Tagger," 2000, Proc. of the 6th Applied Natural Language Processing Conference, Seattle.

Brill, Eric. "Transformation-Based Error-Driven Learning and Natural Language Processing: A Case Study in Part of Speech Tagging", 1995, Computational Linguistics, vol. 21, No. 4, pp. 543-565.

Brown et al., "A Statistical Approach to Machine Translation," Jun. 1990, Computational Linguistics, vol. 16, No. 2, pp. 79-85.

Brown, Ralf, "Automated Dictionary Extraction for "Knowledge-Free" Example-Based Translation," 1997, Proc. of 7th Int'l Conf. on Theoretical and Methodological Issues in MT, Santa Fe, NM, pp. 111-118.

Brown et al., "The Mathematics of Statistical Machine Translation: Parameter Estimation," 1993, Computational Linguistics, vol. 19, Issue 2, pp. 263-311.

Brown et al., "Word-Sense Disambiguation Using Statistical Methods," 1991, Proc. of 29th Annual ACL, pp. 264-270.

Carl, Michael. "A Constructivist Approach to Machine Translation," 1998, New Methods of Language Processing and Computational Natural Language Learning, pp. 247-256.

Chen, K. and Chen, H., "Machine Translation: An Integrated Approach," 1995, Proc. of 6th Int'l Conf. on Theoretical and Methodological Issue in MT, pp. 287-294.

Chinchor, Nancy, "MUC-7 Named Entity Task Definition," 1997, Version 3.5.

Clarkson, P. and Rosenfeld, R., "Statistical Language Modeling Using the CMU-Cambridge Toolkit", 1997, Proc. ESCA Eurospeech, Rhodes, Greece, pp. 2707-2710.

Corston-Oliver, Simon, "Beyond String Matching and Cue Phrases: Improving Efficiency and Coverage in Discourse Analysis",1998, The AAAI Spring Symposium on Intelligent Text Summarization, pp. 9-15.

Dagan, I. and Itai, A., "Word Sense Disambiguation Using a Second Language Monolingual Corpus", 1994, Computational Linguistics, vol. 20, No. 4, pp. 563-596.

Dempster et al., "Maximum Likelihood from Incomplete Data via the EM Algorithm", 1977, Journal of the Royal Statistical Society, vol. 39, No. 1, pp. 1-38.

Diab, M. and Finch, S., "A Statistical Word-Level Translation Model for Comparable Corpora," 2000, In Proc.of the Conference on ContentBased Multimedia Information Access (RIAO).

Elhadad, M. and Robin, J., "An Overview of SURGE: a Reusable Comprehensive Syntactic Realization Component," 1996, Technical Report 96-03, Department of Mathematics and Computer Science, Ben Gurion University, Beer Sheva, Israel.

Elhadad, M. and Robin, J., "Controlling Content Realization with Functional Unification Grammars", 1992, Aspects of Automated Natural Language Generation, Dale et al. (eds)., Springer Verlag, pp. 89-104.

Elhadad et al., "Floating Constraints in Lexical Choice", 1996, ACL, 23(2): 195-239.

Elhadad, Michael, "FUF: the Universal Unifier User Manual Version 5.2", 1993, Department of Computer Science, Ben Gurion University, Beer Sheva, Israel.

Elhadad. M. and Robin, J., "SURGE: a Comprehensive Plug-in Syntactic Realization Component for Text Generation", 1999 (available at http://www.cs.bgu.ac.il/~elhadad/pub.html).

Elhadad, Michael, "Using Argumentation to Control Lexical Choice: A Functional Unification Implementation", 1992, Ph.D. Thesis, Graduate School of Arts and Sciences, Columbia University.

Fung, Pascale, "Compiling Bilingual Lexicon Entries From a Non-Parallel English-Chinese Corpus", 1995, Proc. of the Third Workshop on Very Large Corpora, Boston, MA, pp. 173-183.

Fung, P. and Yee, L., "An IR Approach for Translating New Words from Nonparallel, Comparable Texts", 1998, 36th Annual Meeting of the ACL, 17th International Conference on Computational Linguistics, pp. 414-420.

Gale, W. and Church, K., "A Program for Aligning Sentences in Bilingual Corpora," 1991, 29th Annual Meeting of the ACL, pp. 177-183.

Germann, Ulrich, "Building a Statistical Machine Translation System from Scratch: How Much Bang for the Buck Can We Expect?" Proc. of the Data-Driven MT Workshop of ACL-01, Toulouse, France, 2001.

Germann et al., "Fast Decoding and Optimal Decoding for Machine Translation", 2001, Proc. of the 39th Annual Meeting of the ACL, Toulouse, France, pp. 228-235.

Diab, Mona, "An Unsupervised Method for Multilingual Word Sense Tagging Using Parallel Corpora: A Preliminary Investigation", 2000, SIGLEX Workshop on Word Senses and Multi-Linguality, pp. 1-9.

Grefenstette, Gregory, "The World Wide Web as a Resource for Example-Based Machine Translation Tasks", 1999, Translating and the Computer 21, Proc. of the 21st International Conf. on Translating and the Computer, London, UK, 12 pp.

Hatzivassiloglou, V. et al., "Unification-Based Glossing", 1995, Proc. of the International Joint Conference on Artificial Intelligence, pp. 1382-1389.

Ide, N. and Veronis, J., "Introduction to the Special Issue on Word Sense Disambiguation: The State of the Art", Mar. 1998, Computational Linguistics, vol. 24, Issue 1, pp. 2-40.

Imamura, Kenji, "Hierarchical Phrase Alignment Harmonized with Parsing", 2001, in Proc. of NLPRS, Tokyo.

Jelinek, F., "Fast Sequential Decoding Algorithm Using a Stack", Nov. 1969, IBM J. Res. Develop., vol. 13, No. 6, pp. 675-685.

Jones, K. Sparck, "Experiments in Relevance Weighting of Search Terms", 1979, Information Processing & Management, vol. 15, Pergamon Press Ltd., UK, pp. 133-144.

Knight, K. and Yamada, K., "A Computational Approach to Deciphering Unknown Scripts," 1999, Proc. of the ACL Workshop on Unsupervised Learning in Natural Language Processing.

Knight, K. and Al-Onaizan, Y., "A Primer on Finite-State Software for Natural Language Processing", 1999 (available at http://www.isi.edu/licensed-sw/carmel).

Knight, Kevin, "A Statistical MT Tutorial Workbook," 1999, JHU Summer Workshop (available at http://www.isi.edu/natural-language/mt/wkbk.rtf).

Knight, Kevin, "Automating Knowledge Acquisition for Machine Translation," 1997, Al Magazine 18(4).

Knight, K. and Chander, I., "Automated Postediting of Documents,"1994, Proc. of the 12th Conference on Artificial Intelligence, pp. 779-784.

Knight, K. and Luk, S., "Building a Large-Scale Knowledge Base for Machine Translation," 1994, Proc. of the 12th Conference on Artificial Intelligence, pp. 773-778.

Knight, Kevin, "Connectionist Ideas and Algorithms," Nov. 1990, Communications of the ACM, vol. 33, No. 11, pp. 59-74.

Knight, Kevin, "Decoding Complexity in Word-Replacement Translation Models", 1999, Computational Linguistics, 25(4).

Knight et al., "Filling Knowledge Gaps in a Broad-Coverage Machine Translation System", 1995, Proc. of the14th International Joint Conference on Artificial Intelligence, Montreal, Canada, vol. 2, pp. 1390-1396.

Knight, Kevin, "Integrating Knowledge Acquisition and Language Acquisition," May 1992, Journal of Applied Intelligence, vol. 1, No. 4.

Knight et al., "Integrating Knowledge Bases and Statistics in MT," 1994, Proc. of the Conference of the Association for Machine Translation in the Americas.

Knight, Kevin, "Learning Word Meanings by Instruction,"1996, Proc. of the National Conference on Artificial Intelligence, vol. 1, pp. 447-454.

Knight, K. and Graehl, J., "Machine Transliteration", 1997, Proc. of the ACL-97, Madrid, Spain.

Knight, K. et al., "Machine Transliteration of Names in Arabic Text," 2002, Proc. of the ACL Workshop on Computational Approaches to Semitic Languages.

Knight, K. and Marcu, D., "Statistics-Based Summarization—Step One: Sentence Compression," 2000, American Association for Artificial Intelligence Conference, pp. 703-710.

Knight et al., "Translation with Finite-State Devices," 1998, Proc. of the 3rd AMTA Conference, pp. 421-437.

Knight, K. and Hatzivassiloglou, V., "Two-Level, Many-Paths Generation," 1995, Proc. of the 33rd Annual Conference of the ACL, pp. 252-260.
Knight, Kevin, "Unification: A Multidisciplinary Survey," 1989, ACM Computing Surveys, vol. 21, No. 1.
Koehn, P. and Knight, K., "ChunkMT: Statistical Machine Translation with Richer Linguistic Knowledge," Apr. 2002, Information Sciences Institution.
Koehn, P. and Knight, K., "Estimating Word Translation Probabilities from Unrelated Monolingual Corpora Using the EM Algorithm," 2000, Proc. of the 17th meeting of the AAAI.
Koehn, P. and Knight, K., "Knowledge Sources for Word-Level Translation Models," 2001, Conference on Empirical Methods in Natural Language Processing.
Kurohashi, S. and Nagao, M., "Automatic Detection of Discourse Structure by Checking Surface Information in Sentences," 1994, Proc. of COL-LING '94, vol. 2, pp. 1123-1127.
Langkilde-Geary, Irene, "An Empirical Verification of Coverage and Correctness for a General-Purpose Sentence Generator," 1998, Proc. 2nd Int'l Natural Language Generation Conference.
Langkilde-Geary, Irene, "A Foundation for General-Purpose Natural Language Generation: Sentence Realization Using Probabilistic Models of Language," 2002, Ph.D. Thesis, Faculty of the Graduate School, University of Southern California.
Langkilde, Irene, "Forest-Based Statistical Sentence Generation," 2000, Proc. of the 1st Conference on North American chapter of the ACL, Seattle, WA, pp. 170-177.
Langkilde, I. and Knight, K., "The Practical Value of N-Grams in Generation," 1998, Proc. of the 9th International Natural Language Generation Workshop, p. 248-255.
Langkilde, I. and Knight, K., "Generation that Exploits Corpus-Based Statistical Knowledge," 1998, Proc. of the COLING-ACL, pp. 704-710.
Mann, G. and Yarowsky, D., "Multipath Translation Lexicon Induction via Bridge Languages," 2001, Proc. of the 2nd Conference of the North American Chapter of the ACL, Pittsburgh, PA, pp. 151-158.
Manning, C. and Schutze, H., "Foundations of Statistical Natural Language Processing," 2000, The MIT Press, Cambridge, MA [redacted].
Marcu, D. and Wong, W., "A Phrase-Based, Joint Probability Model for Statistical Machine Translation," 2002, Proc. of ACL-2 conference on Empirical Methods in Natural Language Processing, vol. 10, pp. 133-139.
Marcu, Daniel, "Building Up Rhetorical Structure Trees," 1996, Proc. of the National Conference on Artificial Intelligence and Innovative Applications of Artificial Intelligence Conference, vol. 2, pp. 1069-1074.
Marcu, Daniel, "Discourse trees are good indicators of importance in text," 1999, Advances in Automatic Text Summarization, The MIT Press, Cambridge, MA.
Marcu, Daniel, "Instructions for Manually Annotating the Discourse Structures of Texts," 1999, Discourse Annotation, pp. 1-49.
Marcu, Daniel, "The Rhetorical Parsing of Natural Language Texts," 1997, Proceedings of ACL/EACL '97, pp. 96-103.
Marcu, Daniel, "The Rhetorical Parsing, Summarization, and Generation of Natural Language Texts," 1997, Ph.D. Thesis, Graduate Department of Computer Science, University of Toronto.
Marcu, Daniel, "Towards a Unified Approach to Memory- and Statistical-Based Machine Translation," 2001, Proc. of the 39th Annual Meeting of the ACL, pp. 378-385.
Melamed, I. Dan, "A Word-to-Word Model of Translational Equivalence," 1997, Proc. of the 35th Annual Meeting of the ACL, Madrid, Spain, pp. 490-497.
Melamed, I. Dan, "Automatic Evaluation and Uniform Filter Cascades for Inducing N-Best Translation Lexicons," 1995, Proc. of the 3rd Workshop on Very Large Corpora, Boston, MA, pp. 184-198.
Melamed, I. Dan, "Empirical Methods for Exploiting Parallel Texts," 2001, MIT Press, Cambridge, MA [table of contents].
Meng et al., "Generating Phonetic Cognates to Handle Named Entities in English-Chinese Cross-Language Spoken Document Retrieval," 2001, IEEE Workshop on Automatic Speech Recognition and Understanding, pp. 311-314.
Miike et al., "A full-text retrieval system with a dynamic abstract generation function," 1994, Proceedings of SI-GIR '94, pp. 152-161.
Mikheev et al., "Named Entity Recognition without Gazeteers," 1999, Proc. of European Chapter of the ACL, Bergen, Norway, pp. 1-8.
Monasson et al., "Determining computational complexity from characteristic 'phase transitions'," Jul. 1999, Nature Magazine, vol. 400, pp. 133-137.
Mooney, Raymond, "Comparative Experiments on Disambiguating Word Senses: An Illustration of the Role of Bias in Machine Learning," 1996, Proc. of the Conference on Empirical Methods in Natural Language Processing, pp. 82-91.
Niessen,S. and Ney, H, "Toward hierarchical models for statistical machine translation of inflected languages," 2001, Data-Driven Machine Translation Workshop, Toulouse, France, pp. 47-54.
Och, F. and Ney, H, "Improved Statistical Alignment Models," 2000, 38th Annual Meeting of the ACL, Hong Kong, pp. 440-447.
Och et al., "Improved Alignment Models for Statistical Machine Translation," 1999, Proc. of the Joint Conf. of Empirical Methods in Natural Language Processing and Very Large Corpora, pp. 20-28.
Papineni et al., "Bleu: a Method for Automatic Evaluation of Machine Translation," 2001, IBM Research Report, RC22176(WO102-022).
Pla et al., "Tagging and Chunking with Bigrams," 2000, Proc. of the 18th Conference on Computational Linguistics, vol. 2, pp. 614-620.
Rapp, Reinhard, Automatic Identification of Word Translations from Unrelated English and German Corpora, 1999, 37th Annual Meeting of the ACL, pp. 519-526.
Rapp, Reinhard, "Identifying Word Translations in Non-Parallel Texts," 1995, 33rd Annual Meeting of the ACL, pp. 320-322.
Resnik, P. and Yarowsky, D., "A Perspective on Word Sense Disambiguation Methods and Their Evaluation," 1997, Proceedings of SIGLEX '97, Washington, DC, pp. 79-86.
Resnik, Philip, "Mining the Web for Bilingual Text," 1999, 37th Annual Meeting of the ACL, College Park, MD, pp. 527-534.
Rich, E. and Knight, K., "Artificial Intelligence, Second Edition," 1991, McGraw-Hill Book Company [redacted].
Richard et al., "Visiting the Traveling Salesman Problem with Petri nets and application in the glass industry," Feb. 1996, IEEE Emerging Technologies and Factory Automation, pp. 238-242.
Robin, Jacques, "Revision-Based Generation of Natural Language Summaries Providing Historical Background: Corpus-Based Analysis, Design Implementation and Evaluation," 1994, Ph.D. Thesis, Columbia University, New York.
Sang, E. and Buchholz, S., "Introduction to the CoNLL-2000 Shared Task: Chunking," 20002, Proc. of CoNLL-2000 and LLL-2000, Lisbon, Portugal, pp. 127-132.
Schmid, H., and Walde, S., "Robust German Noun Chunking With a Probabilistic Context-Free Grammar," 2000, Proc. of the 18th Conference on Computational Linguistics, vol. 2, pp. 726-732.
Selman et al., "A New Method for Solving Hard Satisfiability Problems," 1992, Proc. of the 10th National Conference on Artificial Intelligence, San Jose, CA, pp. 440-446.
Schutze, Hinrich, "Automatic Word Sense Discrimination," 1998, Computational Linguistics, Special Issue on Word Sense Disambiguation, vol. 24, Issue 1, pp. 97-123.
Sobashima et al., "A Bidirectional Transfer-Driven Machine Translation System for Spoken Dialogues," 1994, Proc. of 15th Conference on Computational Linguistics, vol. 1, pp. 64-68.
Shapiro, Stuart (ed.), "Encyclopedia of Artificial Intelligence, 2nd edition", vol. 2, 1992, John Wiley & Sons Inc; "Unification" article, K. Knight, pp. 1630-1637.
Soricut et al., "Using a large monolingual corpus to improve translation accuracy," 2002, Lecture Notes in Computer Science, vol. 2499, Proc. of the 5th Conference of the Association for Machine Translation in the Americas on Machine Translation: From Research to Real Users, pp. 155-164.
Stalls, B. and Knight, K., "Translating Names and Technical Terms in Arabic Text," 1998, Proc. of the COLING/ACL Workkshop on Computational Approaches to Semitic Language.
Sun et al., "Chinese Named Entity Identification Using Class-based Language Model," 2002, Proc. of 19th International Conference on Computational Linguistics, Taipei, Taiwan, vol. 1, pp. 1-7.

Sumita et al., "A Discourse Structure Analyzer for Japanese Text," 1992, Proc. of the International Conference on Fifth Generation Computer Systems, vol. 2, pp. 1133-1140.

Taylor et al., "The Penn Treebank: An Overview," in A. Abeill (ed.), Treebanks: Building and Using Parsed Corpora, 2003, pp. 5-22.

Tiedemann, Jorg, "Automatic Construction of Weighted String Similarity Measures," 1999, In Proceedings of the Joint SIGDAT Conference on Emperical Methods in Natural Language Processing and Very Large Corpora.

Tillmann et al., "A DP based Search Using Monotone Alignments in Statistical Translation," 1997, Proc. of the Annual Meeting of the ACL, pp. 366-372.

Tillman, C. and Xia, F., "A Phrase-Based Unigram Model for Statistical Machine Translation," 2003, Proc. of the North American Chapter of the ACL on Human Language Technology, vol. 2, pp. 106-108.

Veale, T. and Way, A., "Gaijin: A Bootstrapping, Template-Driven Approach to Example-Based MT," 1997, Proc. of New Methods in Natural Language Processing (NEMPLP97), Sofia, Bulgaria.

Vogel, S. and Ney, H., "Construction of a Hierarchical Translation Memory," 2000, Proc. of Cooling 2000, Saarbrucken, Germany, pp. 1131-1135.

Vogel et al., "The CMU Statistical Machine Translation System," 2003, Machine Translation Summit IX, New Orleans, LA.

Vogel et al., "The Statistical Translation Module in the Verbmobil System," 2000, Workshop on Multi-Lingual Speech Communication, pp. 69-74.

Wang, Ye-Yi, "Grammar Interference and Statistical Machine Translation," 1998, Ph.D Thesis, Carnegie Mellon University, Pittsburgh, PA.

Watanbe et al., "Statistical Machine Translation Based on Hierarchical Phrase Alignment," 2002, 9th International Conference on Theoretical and Methodological Issues in Machin Translation (TMI-2002), Keihanna, Japan, pp. 188-198.

Witbrock, M. and Mittal, V., "Ultra-Summarization: A Statistical Approach to Generating Highly Condensed Non-Extractive Summaries," 1999, Proc. of SIGIR '99, 22nd International Conference on Research and Development in Information Retrieval, Berkeley, CA, pp. 315-316.

Wang, Y. and Waibel, A., "Decoding Algorithm in Statistical Machine Translation," 1996, Proc. of the 35th Annual Meeting of the ACL, pp. 366-372.

Wu, Dekai, "Stochastic Inversion Transduction Grammars and Bilingual Parsing of Parallel Corpora," 1997, Computational Linguistics, vol. 23, Issue 3, pp. 377-403.

Wu, Dekai, "A Polynomial-Time Algorithm for Statistical Machine Translation," 1996, Proc. of 34th Annual Meeting of the ACL, pp. 152-158.

Yamada, K. and Knight, K., "A Decoder for Syntax-based Statistical MT," 2001, Proceedings of the 40th Annual Meeting of the ACL, pp. 303-310.

Yamada, K. and Knight, K. "A Syntax-based Statistical Translation Model," 2001, Proc. of the 39th Annual Meeting of the ACL, pp. 523-530.

Yamamoto et al., "A Comparative Study on Translation Units for Bilingual Lexicon Extraction," 2001, Japan Academic Association for Copyright Clearance, Tokyo, Japan.

Yarowsky, David, "Unsupervised Word Sense Disambiguation Rivaling Supervised Methods," 1995, 33rd Annual Meeting of the ACL, pp. 189-196.

Callan et al., "TREC and TIPSTER Experiments with Inquery," 1994, Information Processing and Management, vol. 31, Issue 3, pp. 327-343.

Cohen, Yossi, "Interpreter for FUF," (available at ftp://ftp.cs.bgu.ac.il/pub/people/elhadad/fuf-life.lf).

Mohri, M. and Riley, M., "An Efficient Algorithm for the N-Best-Strings Problem," 2002, Proc. of the 7th Int. Conf. on Spoken Language Processing (ICSLP'02), Denver, CO, pp. 1313-1316.

Nederhof, M. and Satta, G., "IDL-Expressions: A Formalism for Representing and Parsing Finite Languages in Natural Language Processing," 2004, Journal of Artificial Intelligence Research, vol. 21, pp. 281-287.

Och, F. and Ney, H., "Discriminative Training and Maximum Entropy Models for Statistical Machine Translation," 2002, Proc. of the 40th Annual Meeting of the ACL, Philadelphia, PA, pp. 295-302.

Resnik, P. and Smith, A., "The Web as a Parallel Corpus," Sep. 2003, Computational Linguistics, Special Issue on Web as Corpus, vol. 29, Issue 3, pp. 349-380.

Russell, S. and Norvig, P., "Artificial Intelligence: A Modern Approach," 1995, Prentice-Hall, Inc., New Jersey [redacted—table of contents].

Ueffing et al., "Generation of Word Graphs in Statistical Machine Translation," 2002, Proc. of Empirical Methods in Natural Language Processing (EMNLP), pp. 156-163.

Kumar, R. and Li, H., "Integer Programming Approach to Printed Circuit Board Assembly Time Optimization," 1995, IEEE Transactions on Components, Packaging, and Manufacturing, Part B: Advance Packaging. vol. 18, No. 4, pp. 720-727.

Ueffing et al., "Using Pos Information for Statistical Machine Translation into Morphologically Rich Languages," In EACL, 2003: Proceedings of the Tenth Conference on European Chapter of the Association for Computational Linguistics, pp. 347-354. (NPL0228).

Frederking et al., "Three Heads are Better Than One," In Proceedings of the 4th Conference on Applied Natural Language Processing, Stuttgart, Germany, 1994, pp. 95-100. (NPL0229).

Och et al., "Discriminative Training and Maximum Entropy Models for Statistical Machine Translation," In Proc. Of the 40th Annual Meeting of the Association for Computational Linguistics (ACL), Philadelphia, PA, 2002. (NPL0230).

Yasuda et al., "Automatic Machine Translation Selection Scheme to Output the Best Result," Proc of LREC, 2002, pp. 525-528. (NPL0231).

Nagao, K. et al., "Semantic Annotation and Transcoding: Making Web Content More Accessible," IEEE Multimedia, vol. 8, Issue 2 Apr.-Jun. 2001, pp. 69-81.

Norvig, Peter, "Techniques for Automatic Memoization with Applications to Context-Free Parsing", Compuational Linguistics, 1991, pp. 91-98, vol. 17, No. 1.

Och et al. "A Smorgasbord of Features for Statistical Machine Translation." HLTNAACL Conference. Mar. 2004, 8 pages.

Och, F., "Minimum Error Rate Training in Statistical Machine Translation," In Proceedings of the 41st Annual Meeting on Assoc. for Computational Linguistics—vol. 1 (Sapporo, Japan, Jul. 7-12, 2003). Annual Meeting of the ACL. Assoc. for Computational Linguistics, Morristown, NJ, 160-167. DOI=http://dx.doi.org/10.3115/1075096.

Och, F. and Ney, H., "A Systematic Comparison of Various Statistical Alignment Models," Computational Linguistics, 2003, 29:1, 19-51.

P. Koehn and K. Knight: "ChunkMT: Statistical Machine Translation with Richer Linguistic Knowledge" Information Sciences Institute, 'Online! Apr. 20, 2002, XP00279142.

Perugini, Saviero et al., "Enhancing Usability in CITIDEL: Multimodal, Multilingual and Interactive Visualization Interfaces," JCDL '04, Tucson, AZ, Jun. 7-11, 2004, pp. 315-324.

Petrov et al., "Learning Accurate, Compact and Interpretable Tree Annotation," Jun. 4-9, 2006, in Proc. of the Human Language Technology Conference of the North American Chapter of the ACL, pp. 433-440.

Qun, Liu, "A Chinese-English Machine Translation System Based on Micro-Engine Architecture," An Int'l. Conference on Translation and Information Technology, Hong Kong, Dec. 2000, pp. 1-10.

Rambow, O. and Bangalore S., "Corpus-Based Lexical Choice in Natural Language Generation," Proceedings of the 38th Annual Meeting on Association for Computational Linguistics, 2000.

Rayner et al., "Hybrid Language Processing in the Spoken Language Translator," IEEE, pp. 107-110.

Rogati et al., "Resource Selection for Domain-Specific Cross-Lingual IR," ACM 2004, pp. 154-161.

Ruiqiang, Z. et al., "The NiCT-ATR Statistical Machine Translation System for the IWSLT 2006 Evaluation," submitted to IWSLT, 2006.

Shankar Kumar and William Byrne. "Minimum Bayes-Risk Decoding for Statistical Machine Translation." HLTNAACL Conference. Mar. 2004, 8 pages.

Shirai, S., "A Hybrid Rule and Example-based Method for Machine Translation," NTT Communication Science Laboratories, pp. 1-5.

Taro Watanabe, Kenji Imammura and Eiichiro Sumita: "Statistical Machine Translation Based on Hierarchical Phrase Alignment" Proceedings of the 9th International Conference on Theorretical and Methodological Issues in Machine Translation, 'Online! Mar. 13-17, 2002, XP002279140 Keihanna, Japan Retrieved from the Internet: <URL:http://www.eamt.org/archive/tmi2002/conference/19_atanabe.pdf>'retrieved on May 6, 2004!.

Taskar, B., et al., "A Discriminative Matching Approach to Word Alignment," In Proceedings of the Conference on Human Language Technology and Empirical Methods in Natural Language Processing (Vancouver, BC, Canada, Oct. 6-8, 2005). Human Language Technology Conference. Assoc. for Computational Linguistics, Morristown, NJ.

Tomas, J., "Binary Feature Classification for Word Disambiguation in Statistical Machine Translation," Proceedings of the 2nd Int'l. Workshop on Pattern Recognition, 2002, pp. 1-12.

Uchimoto, K. et al., "Word Translation by Combining Example-based Methods and Machine Learning Models," Natural LanguageProcessing (Shizen Gengo Shori), vol. 10, No. 3, Apr. 2003, pp. 87-114. (Japanese).

Uchimoto, K. et al., "Word Translation by Combining Example-based Methods and Machine Learning Models," Natural LanguageProcessing (Shizen Gengo Shori), vol. 10, No. 3, Apr. 2003, pp. 87-114. (English Translation).

Varga et al, "Parallel corpora for medium density languages", In Proceedings of RANLP 2005, pp. 590-596.

Vogel S; Och F-J; Ney: "The statistical translation module in the Vermobil system" Workshop on Multi-Lingual Speech Communication, 'Online! Oct. 11-13, 2000, pp. 69-74, XP 002279143 Kyoto, Japan Retrieved from the Internet: <URL:http://www-i6.infromatik.rwth-aachen.de/Colleagues/och/Translation_ATR_17Aug00.ps>'retrieved on May 6, 2004!.

Yamada K., "A Syntax-Based Statistical Translation Model," 2002 PhD Dissertation, pp. 1-141.

Yamamoto et al, "Acquisition of Phrase-level Bilingual Correspondence using Dependency Structure" In Proceedings of COLING-2000, pp. 933-939.

Ying, Stephan V. et al., "The CMU Statistical Machine Translation System," In Proceedings of MT Summit IX 2003.

Zhang et al., "Synchronous Binarization for Machine Translations," Jun. 4-9, 2006, in Proc. Of the Human Language Technology Conference of the North American Chapter of the ACL, pp. 256-263.

Zhang et al., "Distributed Language Modeling for N-best List Reranking," In Proceedings of the 2006 Conference on Empirical Methods in Natural Language Processing (Sydney, Australia, Jul. 22-23, 2006). ACL Workshops. Assoc. for Computational Linguistics, Morristown, NJ, 216-223.

"Patent Cooperation Treaty International Preliminary Report on Patentability and The Written Opinion, Internationalapplication No. PCT/US2008/004296, Oct. 6, 2009, 5 pgs."

Gale, W. and Church, K., "A Program for Aligning Sentences in Bilingual Corpora," 1993, Computational Linguisitcs, vol. 19, No. 1, pp. 177-184.

Document, Wikipedia.com, web.archive.org (Feb. 24, 2004) <http://web.archive.org/web/20040222202831 /http://en.wikipedia.org/wikiiDocument>, Feb. 24, 2004 (NPL0220).

Identifying, Dictionary.com, wayback.archive.org (Feb. 28, 2007) <http://wayback.archive.org/web/200501 01 OOOOOO*/http:////dictionary.reference.com//browse//identifying>, Feb 28, 2005 <http://web.archive.org/web/20070228150533/http://dictionary.reference.com/browse/identifying> (NPL0221).

Koehn, P., et al, "Statistical Phrase-Based Translation," Proceedings of of HLT-NAACL 2003 Main Papers, pp. 48-54 Edmonton, May-Jun. 2003. (NPL0222).

Abney, S.P., "Stochastic Attribute Value Grammars", Association for Computional Linguistics, 1997, pp. 597-618 (NPL0223).

Tillman, C., et al, "Word Reordering and a Dynamic Programming Beam Search Algorithm for Statistical Machine Translation"<URL:http://acl.ldc.upenn.edu/J/J03/J03-1005.pdf>(NPL0225).

Fox, H., "Phrasal Cohesion and Statistical Machine Translation" Proceedings of the Conference on Empirical Methods in Natural Language Processing, Philadelphia, Jul. 2002, pp. 304-311. Association for Computational Linguistics. <URL: http://acl.ldc.upenn.edu/W/W02/W02-1039.pdf>(NPL0224).

"Bangalore, S. and Rambow, O., "Using TAGs, a Tree Model, and a Language Model for Generation," May 2000, Workshop TAG+5, Paris. (NPL0017)".

Gale, W. and Church, K., "A Program for Aligning Sentences in Bilingual Corpora," 1993, Computational Linguisitcs, vol. 19, No. 1, pp. 75-102 (NPL0064).

Yamada K., "A Syntax-Based Statistical Translation Model," 2002 PhD Dissertation, pp. 1-141. (NPL0212).

Agbago, A., et al., "True-casing for the Portage System," In Recent Advances in Natural Language Processing (Borovets, Bulgaria), Sep. 21-23, 2005, pp. 21-24.

Al-Onaizan et al., "Translation with Scarce Resources," 2000 Univ. of Southern Calif., pp. 1-7.

Al-Onaizan, Y. and Knight K., "Machine Transliteration of Names in Arabic Text," Proceedings of ACL Workshop on Computational Approaches to Semitic Languages. Philadelphia, 2002.

Al-Onaizan, Y.,Curin, J., Jahr, M., Knight, K., Lafferty, J., Melamed, D., Och, F.-J., Purdy, D., Smith, N. A., and Yarowsky, D., "Statistical Machine Translation, Final Report," JHU Workshop 1999. Technical Report, CLSP/JHU, 1999.

Alshawi, Hiyan, "Head Automata for Speech Translation", Proceedings of the ICSLP 96, 1996, Philadelphia, Pennslyvania.

Ambati, "Dependency Structure Trees in Syntax Based Machine Translation," Spring 2008 Report <http://www.cs.cmu.edu/~vamshi/publications/DependencyMT_report.pdf>, pp. 1-8.

Arun, A., et al., "Edinburgh System Description for the 2006 TC-STAR Spoken Language Translation Evaluation," in TC-STAR Workshop on Speech-to-Speech Translation (Barcelona, Spain), Jun. 2006, pp. 37-41.

Ballesteros, L. et al., "Phrasal Translation and Query Expansion Techniques for Cross-Language Information," SIGIR 97, Philadelphia, PA, © 1997, pp. 84-91.

Bannard, C. and Callison-Burch, C., "Paraphrasing with Bilingual Parallel Corpora," In Proceedings of the 43rd Annual Meeting on Association for Computational Linguistics (Ann Arbor, MI, Jun. 25-30, 2005). Annual Meeting of the ACL Assoc. for Computational Linguistics, Morristown, NJ, 597-604. DOI=http://dx.doi.org/10.3115/1219840.

Berhe, G. et al., "Modeling Service-baed Multimedia Content Adaptation in Pervasive Computing," CF '04 (Ischia, Italy) Apr. 14-16, 2004, pp. 60-69.

Boitet, C. et al., "Main Research Issues in Building Web Services," Proc. Of the 6th Symposium on Natural Language Processing, Human and Computer Processing of Language and Speech, © 2005, pp. 1-11.

Brill, Eric, "Transformation-Based Error-Driven Learning and Natural Language Processing: A Case Study in Part of Speech Tagging", 1995, Assocation for Computational Linguistics, vol. 21, No. 4, pp. 1-37.

Callison-Burch, C. et al., "Statistical Machine Translation with Word- and Sentence-aligned Parallel Corpora," In Proceedings of the 42nd Meeting on Assoc. for Computational Linguistics (Barcelona, Spain, Jul. 21-26, 2004). Annual Meeting of the ACL. Assoc. for Computational Linguistics, Morristown, NJ, 1.

Cheng, P. et al., "Creating Multilingual Translation Lexicons with Regional Variations Using Web Corpora," in Proceedings of the 42nd Annual Meeting on Assoc. for Computational Linguistics (Barcelona, Spain, Jul. 21-26, 2004). Annual Meeting of the ACL. Assoc. for Computational Linguistics, Morristown, NJ, 53.

Cheung et al., "Sentence Alignment in Parallel, Comparable, and Quasi-comparable Corpora", In Proceedings of LREC, 2004, pp. 30-33.

Cohen et al., "Spectral Bloom Filters," SIGMOD 2003, Jun. 9-12, 2003, ACM pp. 241-252.

Cohen, "Hardware-Assisted Algorithm for Full-text Large-dictionary String Matching Using n-gram Hashing," 1998, Information Processing and Management, vol. 34, No. 4, pp. 443-464.

Covington, "An Algorithm to Align Words for Historical Comparison", Computational Linguistics, 1996, 22(4), pp. 481-496.

Eisner, Jason, "Learning Non-Isomorphic Tree Mappings for Machine Translation," 2003, in Proc. of the 41st Meeting of the ACL, pp. 205-208.

Fleming, Michael et al., "Mixed-Initiative Translation of Web Pages," AMTA 2000, LNAI 1934, Springer-Verlag, Berlin, Germany, 2000, pp. 25-29.

Franz Josef Och, Hermann Ney: "Improved Statistical Alignment Models" ACLOO:Proc. of the 38th Annual Meeting of the Association for Computational Lingustics, 'Online! Oct. 2-6, 2000, pp. 440-447, XP002279144 Hong Kong, China Retrieved from the Internet: <URL:http://www-i6.informatik.rwth-aachen.de/Colleagues/och/ACLOO.ps> 'retrieved on May 6, 2004! abstract.

Fuji, Ren and Hongchi Shi, "Parallel Machine Translation: Principles and Practice," Engineering of Complex Computer Systems, 2001 Proceedings, Seventh IEEE Int'l Conference, pp. 249-259, 2001.

Fung et al, "Mining Very-non parallel corpora: Parallel sentence and lexicon extractioin via bootstrapping and EM", In EMNLP 2004.

Galley et al., "Scalable Inference and Training of Context-Rich Syntactic Translation Models," Jul. 2006, in Proc. Of the 21st International Conference on Computational Linguistics, pp. 961-968.

Galley et al., "What's in a translation rule?", 2004, in Proc. Of HLT/NAACL '04, pp. 1-8.

Gaussier et al, "A Geometric View on Bilingual Lexicon Extraction from Comparable Corpora", In Proceedings of ACL Jul. 2004.

Gildea, D., "Loosely Tree-based Alignment for Machine Translation," In Proceedings of the 41st Annual Meeting on Assoc. for Computational Linguistics—vol. 1 (Sapporo, Japan, Jul. 7-12, 2003). Annual Meeting of the ACL Assoc. for Computational Linguistics, Morristown, NJ, 80-87. DOI=http://dx.doi.org/10.3115/1075096.1075107.

Grossi et al, "Suffix Trees and their applications in string algorithms", In. Proceedings of the 1st South American Workshop on String Processing, Sep. 1993, pp. 57-76.

Gupta et al., "Kelips: Building an Efficient and Stable P2P DHT thorough Increased Memory and Background Overhead," 2003 IPTPS, LNCS 2735, pp. 160-169.

Habash, Nizar, "The Use of a Structural N-gram Language Model in Generation-Heavy Hybrid Machine Translation," University of Maryland, Univ. Institute for Advance Computer Studies, Sep. 8, 2004.

Huang et al., "Relabeling Syntax Trees to Improve Syntax-Based Machine Translation Quality," Jun. 4-9 2006, in Proc. of the Human Language Techology Conference of the North Americna Chapter of the ACL, pp. 240-247.

Ikel, D., Schwartz, R., and Weischedei, R., "An Algorithm that learns What's in a Name," Machine Learning 34, 211-231 (1999).

Imamura et al., "Feedback Cleaning of Machine Translation Rules Using Automatic Evaluation," 2003 Computational Linguistics, pp. 447-454.

Jason Eiser, Computer Science Department, Johns Hopkins University. "Learning Non-Isomorphic Tree Mappings for Machine Translation." 2003, pp. 205-208.

K. Chen and H. Chen: "Machine Translation: An Integrated Approach" Proceedings of the Sixth International Conference on Theoretical and Methodological Issues in Machine Translation, 'Online! Jul. 5-7, 1995, pp. 287-294, XP002279141 Leuven, Belgium.

Kenji Yamada and Kevin Knight. "A Syntax Based Statistical translation Model", 39th Annual Meeting for the Association for Computational Linguistics, 2001, pp. 1-8.

Klein et al., "Accurate Unlexicalized Parsing," Jul. 2003m, in Proc. of the 41st Annual Meeting of the ACL, pp. 423-430.

Knight, K. and Al-Onaizan,Y., "Machine Transliteration", 1997, Proc. of the ACL-97, Madrid, Spain, pp. 97.103.

Knight, K. and Al-Onaizan, Y., "Translation with Finite-State Devices," Proceedings of the 4th AMTA Conference, 1998.

Koehn, Philipp, "Noun Phrase Translation," A PhD Dissertation for the University of Southern California, pp. xiii, 23, 25-57, 72-81, Dec. 2003.

Kupiec, Julian, "An Algorithm for Finding Noun Phrase Correspondecnes in Bilingual Corpora," In Proceedings of the 31st Annual Meeting of the ACL, 1993, pp. 17-22.

"Lee-Y.S.," "Neural Network Approach to Adaptive Learning: with an Application to Chinese HomophoneDisambiguation," "IEEE pp. 1521-1526."

Lita, L., et al., "tRuEcasing," Proceedings of the 41st Annual Meeting of the Assoc. for Computational Linguistics (In Hinrichs, E. And Roth, D.—editors), pp. 152-159.

Llitjos, A. F. et al., "The Translation Correction Tool: English-Spanish User Studies," Citeseer © 2004, downloaded from: http://gs37.sp.cs.cmu.edu/ari/papers/lrec04/fontll, pp. 1-4.

Mann, "Multipath Translation Lexicon Induction via Bridge Language," 2001, Johns Hopkins University, pp. 1-8.

McCallum, A. and Li, W., "Early Results for Named Entity Recognition with Conditional Random Fields, Feature Induction and Web-enhanced Lexicons," In Proceedings of the Seventh Conference on Natural Language Learning at HLT-NAACL, 2003, vol. 4 (Edmonton, Canada), Assoc. for Computational Linguistics, Morristown, NJ, pp. 188-191.

McDevitt, K. et al., "Designing of a Community-based Translation Center," Technical Report TR-03-30, Computer Science, Virginia Tech, © 2003, pp. 1-8.

Metze, F. et al., "The Nespole! Speech-to-Speech Translation System," Proc. Of the HLT 2002, 2nd Int'l Conf. on Human Language Technology (San Francisco, CA), © 2002, pp. 378-383.

Mohri, Mehryar, "Regular Approximation of Context Free Grammars Through Transformation", 2000, pp. 251-261, "Robustness in Language and Speech Technology", Chapter 9, Kluwer Academic Publishers.

Wang, W., et al. "Capitalizing Machine Translation" in HLT-NAACL '06 Proceedings Jun. 2006. <http://www.isi.edu/natural-language/mt/hlt-naac1-06-wang.pdf> (NPL0226).

Langlais, P. et al., "TransType: a Computer-Aided Translation Typing System" EmbedMT '00 ANLP-NAACL 2000 Workshop: Embedded Machine Translation Systems, 2000, pp. 46-51. <http://acl.ldc.upenn.edu/W/W00/W00-0507.pdf> (NPL0227).

* cited by examiner

DISCOVERY OF PARALLEL TEXT PORTIONS IN COMPARABLE COLLECTIONS OF CORPORA AND TRAINING USING COMPARABLE TEXTS

CROSS-REFERENCE TO RELATED APPLICATIONS

This application claims the benefit of the priority of U.S. Provisional Application Ser. No. 60/555,807, filed Mar. 23, 2004 and entitled "Parallel Text Discovery System", the disclosure of which is hereby incorporated by reference.

STATEMENT OF REGARDING FEDERALLY SPONSORED RESEARCH OR DEVELOPMENT

The invention was made with government support under Contract No. N66001-00-1-8914 awarded by the Space and Naval Warfare Systems Command. The government has certain rights in the invention.

BACKGROUND

In the field of data-driven machine translation, it is desirable to obtain as much parallel data as possible about the language pair for which the translation system is built. Mutual translations of source and target language texts and text fragments are used as data to feed a learning engine, which builds models that are then used by an actual translation engine. Parallel texts, i.e., texts and text fragments that are mutual translations of each other, are an important resource in these applications.

Unfortunately, parallel texts are a scarce resource. Parallel texts are often limited in size, coverage and language. The parallel texts that do exist are usually from one domain, which may be problematic because certain machine translation systems trained in a first domain will not perform well in a second, different domain.

Certain textual resources which are not parallel may still be related in that they contains information about the same subject. Examples of such resources include the multilingual newsfeeds produced by several news agencies. Examples of these news agencies may include Agence France Presse, Xinhua News, and others. The same or similar news stories are often found in different languages. Therefore, while the texts may not be parallel—an Aljazera story about president Bush's visit to Europe may be written independently from a CNN story about the same visit, much information can be obtained from these comparable stories that can be useful in the context of developing translation systems.

A parallel text discovery system attempts to discovers pairs of sentences or segments which are translations of one another starting from collections of non-parallel documents. Previous research efforts have attempted to discover parallel sentences in parallel text. These techniques assume the parallel texts to be mutual, complete translations of each other and attempt to align all the sentences in these related text.

Zhou et al, "Adaptive parallel sentences mining from Web bilingual news collection" 2002 IEEE international conference on data mining, use a generative model for discovering parallel sentences between Chinese and English sentences. This and other comparable systems define a sentence alignment score and use dynamic programming to find the best sentence alignment between a pair of documents. Performance depends heavily on the degree to which the input consists of true parallel documents. If the method is applied, for example, to 2 documents of 20 sentences each that share only one sentence or sentence fragment, the techniques will not be likely to obtain useful information from sentences that convey the same meaning.

SUMMARY

The present system allows judging each of a plurality of sentence pairs in a "nonparallel" comparable corpus individually, without using context, and without assuming that the texts which contain the sentences are in any way related. Throughout this document, the term "nonparallel" refers to a collection of texts or other information that is not necessarily parallel—it may include both parallel and nonparallel portions, but basically the relationship between the sentences in the articles in the database is unknown.

An embodiment uses a classifier which accurately labels sentence pairs as parallel or nonparallel by inspecting different kinds of correspondences between the words. This enables extracting parallel sentences from very large comparable databases of "unrelated" texts The texts are "unrelated" in the sense that they are not necessarily related. However, of course, they must include related information in order to be useful as a training resource.

An embodiment may use document pair selection as a filter.

Another embodiment may carry out a iterative training, or bootstrapping using the information in a database. Small amounts of parallel data are used in combination with a massive nonparallel Corpus to extract a larger set of parallel sentences. These parallel sentences can then be used as additional training data to improve the performance of the sentence extraction program. The procedure can be applied repetitively until the improvements reach a certain level.

BRIEF DESCRIPTION OF THE DRAWINGS

These and other aspects will now be described in detail with respect to the accompanying drawings, wherein.

DETAILED DESCRIPTION

A statistical machine translation system relies on training data that comes from various sources. The training data represents translation information between first language and second language information.

The present system uses unrelated texts. The texts include comparable text in addition to unrelated text. The term "text" is used to refer to any machine readable data in any language, and may include electronic documents of various forms, newsfeeds, web documents, scanned documents, and machine readable information of any kind and from any source. The system obtains its training information from that data. It does this by finding data fragments (sentences or sentence fragments) that are mutual translations of each other and then uses these mutual translations to train a data-driven machine translation system.

While the present specification describes some parameters that can be used to determine parallel phrases and sentences, it should be understood that other parameters can be similarly used.

The domain from which the translations are taken may be used as a parameter in the present system. For example, parallel training data from one domain such as parliamentary proceedings may not perform well on another domain such as news reporting. In another aspect, initial training is carried out using comparable domains, and supplemental training is carried out using other data. This aspect extracts parallel information, e.g., parallel sentences or phrases, from comparable corpora from the domain of interest.

In an embodiment, two different bodies of monolingual texts are obtained. One of the bodies of data uses in-domain data, and the other is referred to as out of domain data. A technique is provided to show how end to end performance of a statistical machine translation system may be improved using both the in domain, and out of domain, data.

Figure 1:
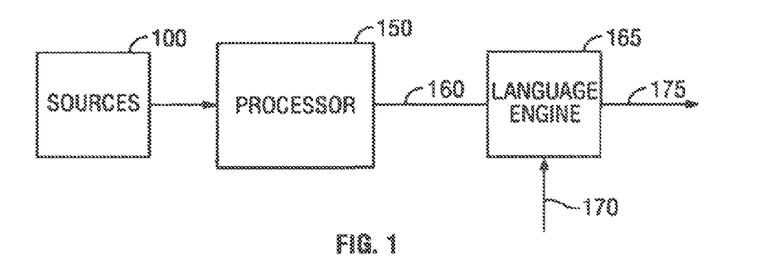
FIG. 1 shows a block diagram of the hardware of the overall system.

FIG. 1 illustrates a block diagram of an exemplary system for machine translation. A processor 150 receives data from various sources 100. The sources may be the non-parallel corpora described herein, and may include other training materials, such as translation memories, dictionaries, glossaries, Internet, and human-created translations. The processor 150 processes this information as described herein to produce parallel sentences and sentence fragments. Using these data, one can use a learning component to create translation parameters which are output as 160. The translation parameters are used by language engine 165 in making translations based on input language 170. In the disclosed embodiment, the language engine 165 is a language translator which translates from a first language to a second language. However, alternatively, the language engine 165 can be any engine that operates on strings of words such as a language recognition device, a speech recognition device, a machine paraphraser, natural language generator, modeler, or the like.

The processor 150 may be any computer driven device, including a general-purpose processor, a computer, a digital signal processor, or a dedicated hardware device that can operate based on programming instructions.

Figure 2:
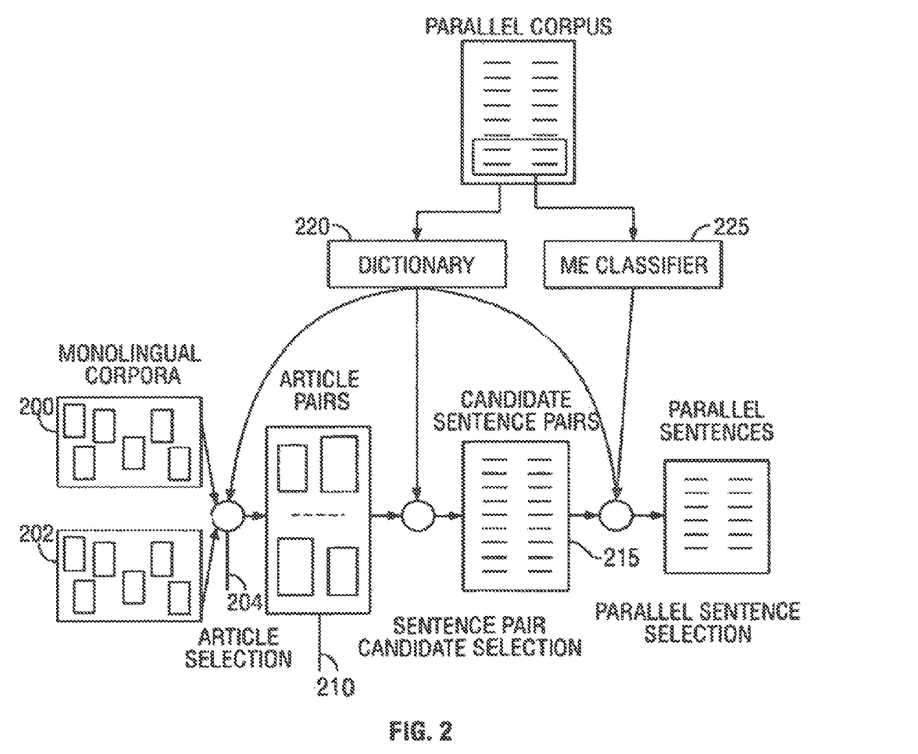
FIG. 2 shows a functional diagram of the operation to extract information from non-parallel corpora.

FIG. 2 shows an overall block diagram of the operation. Two different large monolingual Corpora are obtained, shown as 200 and 202. Corpora 200 is in a first language, and 202 is in a second language. Each corpus includes a plurality of different items, such as articles, and other written information. In an embodiment, the two comparable corpuses were formed of two large monolingual news corpora 200, 202; one written in English and the other in Arabic.

The corpora are divided into articles at 204 and pairs of comparable articles are selected at 210 as another parameter indicative of training. Each article pair is analyzed to determine possible sentence pairs at 215. The candidate sentence pairs obtained at 120 are analyzed using a dictionary 220 and maximum entropy classifier 225 which produces a determination indicative of whether the sentences in each pair are mutual translations of one another.

The output is parallel sentences 230 which can be used for training.

This system may operate with minimal resources, e.g. a dictionary, and/or a small amount of parallel data. In an embodiment, the system may operate with only a small amount of parallel data, from which a dictionary can be learned automatically.

Figure 5:
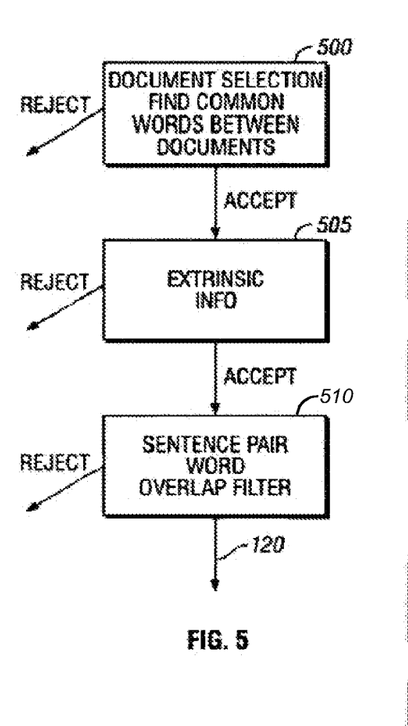
FIG. 5 shows a flowchart of document selection.

FIG. 5 shows a flowchart of operation. The article selection at 204 selects, for each Arabic article, an English article that is likely to contain sentences which are parallel to those in the Arabic document. The article selection at 204 uses a technique which simply finds similar documents without worrying about precision. This embodiment uses coarse matching, with the refinement that subsequent filters are used to filter out extra noise that is obtained by selection of the possibly bad translations.

Document selection may be performed using the IR engine inquiry described in Callen et al, "TREC and Tipster experiments with InQuery", Information Processing and Management, 31(3): 327-343. All the English documents are indexed into a database, and a query is created for each Arabic document. A probabilistic dictionary is formed from the queries. The top translations of each word in the document are obtained, e.g. the top 5 translations for each word. Each word translation is then used to find sentences in the other document that includes that word. A query is created using InQuery's weighted sum, or wsum operator, using the translation probabilities as weights. The query is then run and use to retrieve the top 100 English documents with individual words that match to the Arabic document. This is shown as 500 in FIG. 5.

Extrinsic information is also used at 505 as another parameter. For example, it is likely that documents with similar content will have publication dates that are close to one another. Thus, the top 100 English documents may be further filtered using this extrinsic information. In an embodiment, only those documents published within a window of five days around the publication date of the Arabic query document may be maintained.

Once article pairs have been selected, the candidate sentence pair selection 215 takes all possible sentence pairs in each document pair and passes them through a word overlap filter 510. The filter verifies information to determine the likelihood of a sentence match. For example, the filter may run a ratio check, in which it checks to determine if the ratio of lengths of the two sentences is not greater than two. The filter may then run a word percentage check, e.g. using common words as a parameter, and to check that at least half the words in each sentence have a translation in the other sentence. Any sentence that does not fulfill these two conditions are discarded. The other sentences are passed on to the parallel sentence selection stage as parallel candidate sentence pairs at 120.

The sentence pair candidate selection at 215 reduces much of the noise introduced by the recall oriented document selection procedure. While it may also remove good pairs, many of those good pairs could not have been handled reliably anyway. Therefore, the overall effect of this filter is to improve the precision and robustness of the system.

The candidate sentence pairs at 120 are further analyzed to determine whether the two sentences in a pair are mutual translations. A maximum entropy classifier 225 may be used for this purpose. The pairs that are classified as being mutual translations form the output 175 of the system as parallel sentences.

The maximum entropy statistical modeling framework imposes constraints on the model of the data by defining so-called feature functions. The feature functions emphasize the properties of the data in most useful for the modeling task. For any sentence pair sp, the number of words in either sentence that have a translation in the other sentence, or word overlap, is a useful indicator of whether the sentences are parallel. A feature function f(sp) is defined whose value is a log linear combination of the functions, representing the word overlap of the sentences in sp.

$$P(c_i \mid sp) = \frac{1}{Z(sp)} \prod_{j=1}^{k} \lambda_j^{fij(c,sp)}$$

where c is the class, meaning parallel or not parallel, Z(sp) is a normalization factor, and fi are the feature functions.

The resulting model has free parameters λj, the so-called feature weights. Parameter values that maximize the likelihood of a given training corpus can be computed using techniques such as the GIS algorithm or the IIS algorithm described in Darroch, et. al.

The present system attempts to find feature functions that distinguish between parallel and nonparallel sentence pairs. The pairs are determined by computing and exploiting word level alignments between sentences in each pair. A word alignment between two sentences in two different languages is used as a parameter to specify words in one sentence which are exact translations of words in the other.

Figure 3:
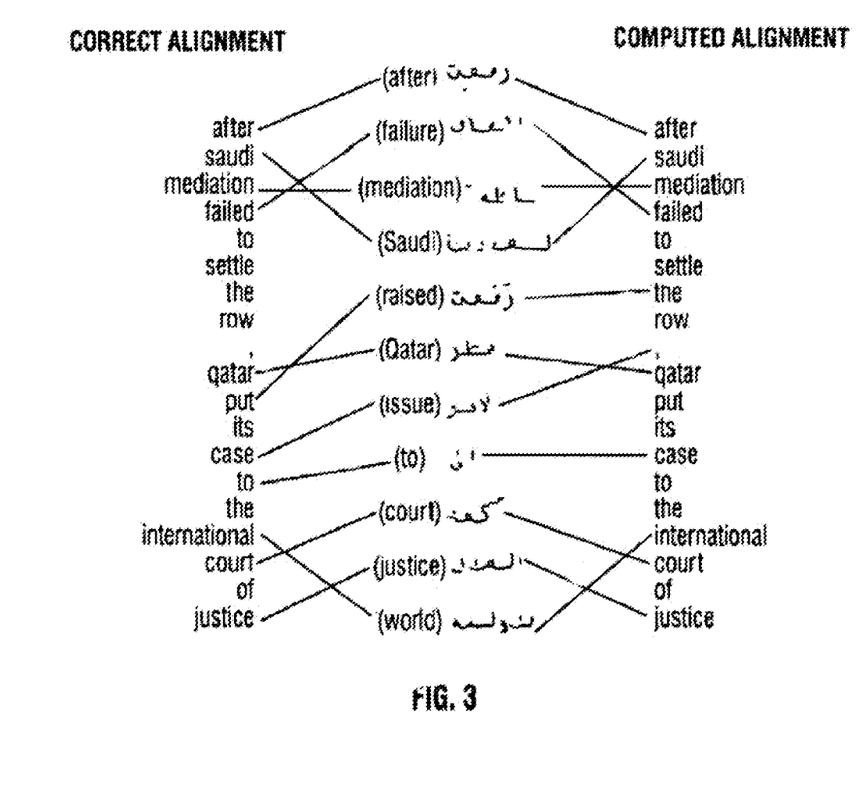
FIGS. 3 and 4 show example alignments between parallel and nonparallel sentences, respectively.
Figure 4:
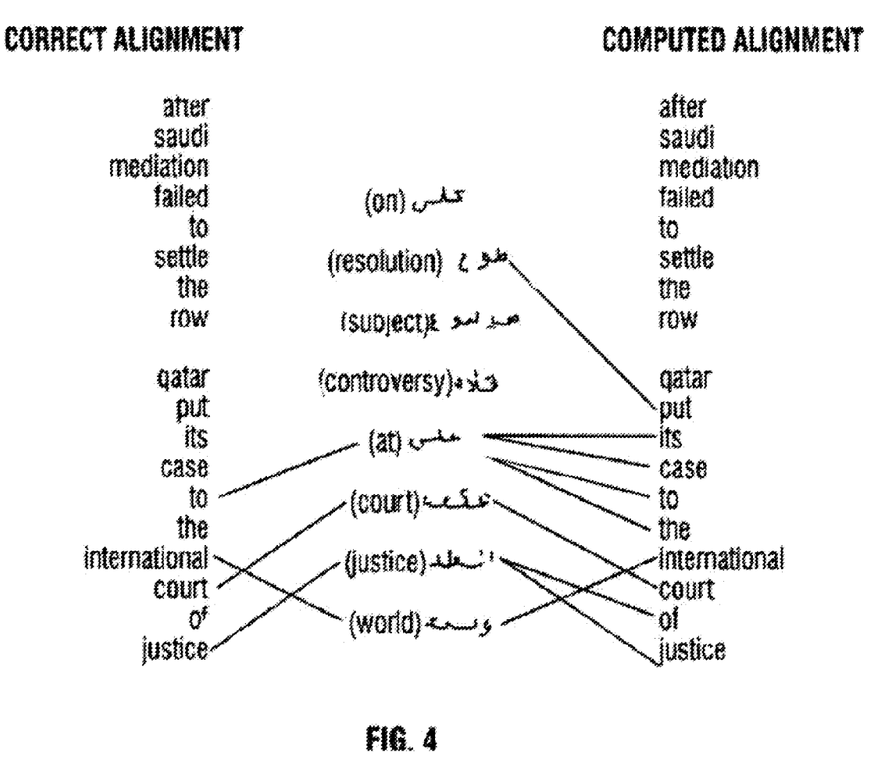

FIG. 3 gives a first example of word alignment between two English-Arabic sentence pairs from comparable corpuses. FIG. 3 contains two alignments. The alignment on the left is produced by a human, and the alignment on the right is computed by the machine. The sentences in FIG. 3 are parallel, while the sentences in FIG. 4 are not parallel. Both machine and human alignments can be used to determine data indicative of parallel sentences.

In a correct alignment between two nonparallel sentences, as shown in FIG. 4, most words (that is, at least 50-75% of the words) have no translation equivalents between the two languages. In contrast, in an alignment between parallel sentences as in FIG. 3, most words, i.e., greater than 70-90% of the words, do have alignment equivalents. Automatically computed alignments, however, may have many incorrect connections due to noisy dictionary entries and shortcomings of the model that is used to generate the alignments. FIG. 4, for example, shows the multiple incorrect connections. Merely looking at the number of unconnected words, without looking at all alignments, therefore, may not be sufficiently discriminative.

This is addressed by defining the fertility of a word in an alignment as the number of words that the word is connected to. In an automatically computed alignment, the presence between a pair of sentences of words of high fertility is indicative of non-parallelism. For example, the English word "at" in FIG. 4 is connected to many different words, and this makes it more likely that these connections were produced because of lack of better alternatives.

Another parameter is the presence of long contiguous spans. Contiguous spans are defined as pairs of bilingual substrings in which the words in one sub string are connected only two words in the other sub string. A span may contain a few words without any connection (a small percentage of the length of the span) but no word with a connection outside the span. For example, the spans may include 3-10 words in a span, that directly translate to corresponding spans.

FIG. 3 shows examples of spans. For example, the English strings, "after Saudi mediation failed" or "to the international Court of Justice" together with their Arabic counterparts form spans. Long continuous spans are indicative of parallelism, since they suggest that the two sentences have long phrases in common. This suggests that the sentences intend to convey parallel information.

For a probabilistic dictionary, the alignment score can be defined as the normalized product of the translation probabilities of the connected word pairs. This score is indicative of how parallel the sentences may be. For example, a pair of nonparallel sentences should have connections of lower probabilities.

Figure 6:
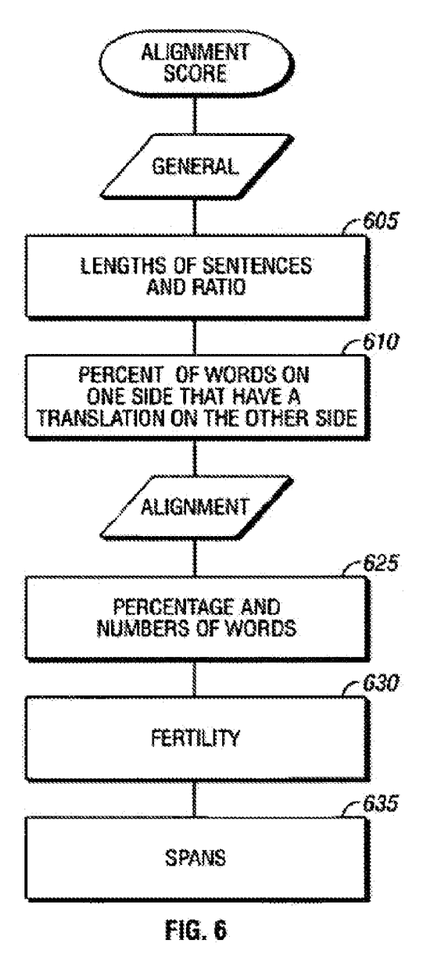
FIG. 6 shows a flowchart of alignment scoring.

FIG. 6 illustrates a classifier using scoring to compute a score related to the alignment between them. This includes parameters that define general features that are independent of the word alignment. The general features can include:

lengths of the sentences as well as length difference and length ratio (605);

percentage of words on each side that have a translation on the other side (610);

Parameters indicative of alignment features may also be tested as part of the alignment score. These may include:

the percentage and number of words that have no connection whatsoever (625). Note that the lack of connection for some individual words is not necessarily indicative of a bad translation. In fact, some words in one language may simply be untranslatable into an other language. However, too many untranslated words, such as more than 50% of the words being untranslatable, may be a strong indication of bad sentence pairing.

fertility score, e.g. the top three largest fertility words (630);

lengths of contiguous spans, e.g., the longest continuous spans (635);

All of this information can be combined to form a score. This can be computed using the IBM model $$P(f, a \mid e) = \frac{\epsilon}{(l+1)^m} \prod_{j=1}^{m} t(f_j \mid e_{a_j})$$

Where the source sentence is f, the target sentence is e, and the alignment is a. In the equation, m is the length of the source sentence, l the is the length of the target sentence, and e-P(m|e).

This basically corresponds to the normalized product of the translation probabilities of all the links in the alignment. The best alignment is computed according to this model, as the alignment that maximizes the product term $$\hat{a} = \operatorname{argmax}_a (P(f, a \mid e)) = \operatorname{argmax}_a \left( \prod_{j=1}^{m} t(f_j \mid e_a) \right)$$

One alignment is computed for each translation direction, that is, a first alignment is computed from f to e, and a second alignment e to f. The alignments are then combined. Three different combination methods may be used, known as intersection, Union and refine, where refine is a form of intersection expanded with certain additional neighboring links.

In the embodiment therefore, alignments are computed for each sentence pair. One set of general features and five set of alignment features are extracted. The parameters of the model are trained on instances obtained from a small (e.g., 30K-200K word) parallel corpus. All possible bilingual sentence pairs from the corpus are obtained, placed through the word overlap filter, and used to create training instances.

Bootstrapping Embodiment

In this embodiment, the classifier is used repetitively, each repetitive use of the classifier improving the results. This re-use of the database and classifier effectively bootstraps the system to improve its performance. The classifier's performance is affected by the dictionary coverage, and the similarity between the domains of the training and test instances. In the embodiment, all the dictionaries are automatically learned from parallel data. This enables creation of dictionaries of various coverage by learning them from parallel corpuses of different sizes. In the test, five dictionaries are used, to learn from five initial out of domain parallel corpuses whose sizes are 100K, 1 Million, 10 M, 50 M and 95 M word corpuses (on the English side). Two training sets were used, one generated from an in domain parallel corpus and another from an out of domain parallel corpus.

Each initial out of domain corpus is used to learn a dictionary. The training and test corpuses are obtained as above, and sentence pairs are generated, passed through the word overlap filter using the dictionary, to obtain two sets of training instances, and one set of test instances. Two different classifiers are respectively trained; one on each training set. Both of them are evaluated on the test set.

The parallel corpora used for generating training and test instances have about 5000 sentence pairs each or approximately 50,000 English tokens. This generates around 10,000 training instances for each training sets.

The comparable corpora used for parallel sentence extractions are collections of news stories. Each language pair is analyzed from these collections to create an in domain comparable corpus by piecing together articles from the same agency around the same time. Another aspect uses this data along with data mined from the Web, obtaining comparable corpora using bilingual news web sites and downloading news articles in each language independently. Web sites and search engines may be used to obtain lists of articles and their URLs to obtain the data.

All of this data may be used to improve the quality of a machine translation system. The main goal extracts parallel training data from an in domain comparable corpus that improves the performance of an out of domain trained system. Thus, the extracted corpus is added to the out of domain training data to improve its performance.

The system evaluates the extracted corpora presented the above. The extraction system that was used to obtain each of those corpora made use of a certain initial out of domain parallel corpus. The baseline system is trained based on that initial corpus. Another system which will be called "plus extracted" is trained on the initial corpus plus the extracted corpus. Results show that the automatically extracted additional training data yields significant improvements in performance over the initial training corpora.

The bootstrapping embodiment described herein allows obtaining a small amount of parallel training data, e.g. in domain data. That data is used to learn a new dictionary. After that, the system uses that dictionary to extract again.

As a test, bootstrapping iterations are carried out starting from two very small corpora, 100,000 English tokens and a million English tokens respectively. After each iteration, the system is trained and evaluated. After each iteration, the system uses the new dictionary to evaluate the database again. This bootstrapping system therefore allows starting with the machine translation from very little parallel data, and using a large amount of comparable nonparallel data to bootstrap into an improved translation.

Iteration may be continued until there is no further improvement in machine translation performance based on the development data or until some point of diminishing returns is reached, e.g., that the improvement is less than some amount. As an example, the iterative system may start with as little as 100,000 English tokens of parallel data. This can iteratively be continued until it may become comparable to parallel training on three orders of magnitude more data.

Although only a few embodiments have been disclosed in detail above, other modifications are possible, and this disclosure is intended to cover all such modifications, and most particularly, any modification which might be predictable to a person having ordinary skill in the art. For example, while the above has described certain models and parameters, it should be understood that the system may use different models and different parameters for the basic functions of article selection and sentence pair extraction. Moreover, while the above has described certain languages, it should be understood that this system may be used with other languages and with other units. Moreover, while the above has described certain size databases, it should be understood that databases of other sizes can alternatively be used.

Also, only those claims which use the words "means for" are intended to be interpreted under 35 USC 112, sixth paragraph. Moreover, no limitations from the specification are intended to be read into any claims, unless those limitations are expressly included in the claims.

What is claimed is:

1. A method, comprising:
obtaining, via a processing module that is executable by a processor, a collection of texts which are not parallel texts;
determining sentences within the collection of texts, whose meaning is substantially the same, by comparing a plurality of sentences within the collection of texts, and determining at least one parameter indicative of a sentence in the first document and a sentence in the second document, and using said at least one parameter to determine sentences which have similar meanings; and
using said sentences which have similar meanings to create training data for a machine translation system.

2. The method recited in claim 1, further comprising using said training data to train a machine translation system.

3. The method recited in claim 1, further comprising, after training said machine translation system, comparing again said sentences in said first document with said sentences in said second document.

4. The method recited in claim 1, wherein said parameter includes dates of texts.

5. The method recited in claim 1, wherein said parameter includes a number of words in common in a specified word phrase.

6. The method recited in claim 1, wherein said parameter includes alignment of words in two specified word phrases.

7. The method recited in claim 1, wherein said parameter includes a fertility representing a number of words to which another word is connected.

8. The method recited in claim 1, wherein said parameter includes a number of words in one sentence which have no corresponding words in the other sentence.

9. The method recited in claim 1, wherein said determining sentences comprises using a first parameter to select a pair of texts which are similar, and determining possible sentence pairs within said pair of texts.

10. The method recited in claim 9, wherein said first parameter comprises dates of the texts.

11. The method recited in claim 9, wherein said determining possible sentence pairs comprises using a word overlap filter to determine likely overlapping sentences.

12. The method recited in claim 11, wherein said word overlap filter verifies that a ratio of the lengths of the sentences is no greater than two, and that at least half the words in each sentence have a translation in the other sentence.

13. The method recited in claim 1, wherein said determining comprises determining a coarse correspondence between two texts, and further filtering said texts to determine sentence pairings within the two texts.

14. A method, comprising:
obtaining, via a processing module that is executable by a processor, a first amount of parallel training data for a learning component of a machine translation system;
using the learning component of the machine translation system trained using said parallel data to determine translation parameters, including at least one probabilistic word dictionary;
using said translation parameters to extract parallel sentences from a second corpus of nonparallel data, where said second corpus is larger than a database of said parallel training data;
using said parallel sentences to create training data for said learning component of said machine translation system;
training said learning component using said training data, and iteratively re-analyzing said comparable corpus using the system thus trained;
continuing said iterative re-analyzing until training reaches a specified level.

15. The method recited in claim 14, wherein said continuing comprises terminating the iterative process when a sufficiently large corpus of training data is obtained.

16. The method recited in claim 14, wherein said continuing comprises terminating the iterative process when a translation system trained on the data stops improving.

17. The method recited in claim 14, wherein said the iteratively reanalyzing is continued until an improvement less than a specified amount is obtained.

18. A computer system, comprising:
a database, storing a first collection of texts in a first language, and a second collection of texts, which are not parallel to said first collection of texts, that are in a second language;
a training processor, that processes said texts to determine portions in the first collection of texts whose meaning is substantially the same as portions within the second collection of texts, by comparing a plurality of sentences within the collection of texts, and determining at least one parameter indicative of a first portion within the first collection and a second portion within the second collection, and using said at least one parameter to determine portions which have similar meanings; and
a translation processor, using training data based on said portions which have similar meanings to translate input text between said first and second languages.

19. The system recited in claim 18, wherein said training processor iteratively operates, by training a dictionary, and then comparing again said first collection and said second collection.

20. The system recited in claim 18, wherein said training processor uses dates of texts as said parameter.

21. The system recited in claim 18, wherein said training processor determines a number of words in common in a specified word phrase, and uses said number of words as said parameter.

22. The system recited in claim 18, wherein said training processor determines alignment of words in two specified word phrases.

23. The system recited in claim 18, wherein said training processor uses a word overlap filter that verifies that a ratio of the lengths of the sentences is no greater than a first specified value, and verifies that at least a second specified number of the words in each sentence have a translation in the other sentence.

24. The system recited in claim 18, wherein said training processor determines a coarse correspondence between two texts, and further filtering said texts to determine sentence pairings within the two texts.

25. A system, comprising:
a database including a first amount of parallel training data for a learning component of a machine translation system, and a second corpus of non parallel data, said second amount greater than said first amount;
a learning processor, forming at least one probabilistic word dictionary using said parallel data and also forming training data, and using said probabilistic word dictionary to determine portions within said second corpus which have comparable meanings, and to refine said training data to form refined training data, based on said second corpus, and to re-train again, based on said second corpus and said refined training data.

26. The system recited in claim 25, further comprising a machine translation system that uses said training data to translate a document.

27. The system recited in claim 25, wherein said learning processor continues said iterative re-analyzing until training reaches a specified level.

28. The system recited in claim 25, wherein said first amount of parallel training data is less than 100 k tokens of information.

29. The system recited in claim 25, wherein said second corpus of data is 10 times greater than said first amount of parallel training data.

* * * * *